United States Patent [19]

Hama

[11] Patent Number: 4,506,959
[45] Date of Patent: Mar. 26, 1985

[54] ZOOM LENS ASSEMBLY WITH SWITCHING MECHANISM FROM OR TO ZOOMING PHOTOGRAPHING TO OR FROM MACRO PHOTOGRAPHING

[75] Inventor: Yoshihiro Hama, Tokyo, Japan

[73] Assignee: Asahi Kogaku Kogyo Kabushiki Kaisha, Tokyo, Japan

[21] Appl. No.: 447,943

[22] Filed: Dec. 8, 1982

[30] Foreign Application Priority Data

Dec. 29, 1981 [JP] Japan .......................... 56-197535[U]

[51] Int. Cl.³ .......................... G02B 7/10; G02B 15/10
[52] U.S. Cl. .................................. 350/430; 350/429; 350/255
[58] Field of Search ................ 350/430, 429, 252, 255

[56] References Cited

U.S. PATENT DOCUMENTS

4,322,150  3/1982  Kamata et al. ..................... 350/430

FOREIGN PATENT DOCUMENTS

| 50119818 | 4/1977 | Japan . |
| 5497766 | 2/1981 | Japan . |
| 54108911 | 4/1981 | Japan . |
| 54131126 | 5/1981 | Japan . |
| 54161871 | 7/1981 | Japan . |

*Primary Examiner*—John K. Corbin
*Assistant Examiner*—P. M. Dzierzynski
*Attorney, Agent, or Firm*—Merchant, Gould, Smith, Edell, Welter & Schmidt

[57] ABSTRACT

An apparatus for converting of zooming photographing to macro photographing and vice versa in a zoom lens assembly comprising a mount securing lens barrel, a convert ring fitted on the periphery of the mount securing, an actuation ring which is fitted on the convert ring, wherein the apparatus comprises a ball retaining groove provided on the mount securing lens barrel, a radial through hole on the convert ring, a ball which is located in the elongated hole so as to move therein, a ball receiving hole provided on the actuation ring, said ball being located between the ball retaining groove and the radial through hole during rotating of the actuation ring for focusing at one zooming end position thereof, to prevent the convert ring from rotating relative to the mount securing lens barrel, said ball coming out of the ball retaining groove when the actuation ring rotates for macro photographing so that the ball comes between the radial through hole and the ball receiving hole to make the convert ring integral with the actuation ring in order to make a relative rotation of the convert ring to the mount securing lens barrel possible.

16 Claims, 20 Drawing Figures

ZOOM LENS ASSEMBLY WITH SWITCHING MECHANISM FROM OR TO ZOOMING PHOTOGRAPHING TO OR FROM MACRO PHOTOGRAPHING

This invention relates to a zoom lens making both common zooming photographing and macro photographing possible, and, in particular to a zoom lens assembly in which zooming, common focussing and special macro photographing can be effected by means of a single actuation ring.

Known are various zoom lenses enabling zooming photographing and macro photographing on the market. One of the most important technical problems of such zoom lenses is how zooming photographing can be easily and quickly shifted or converted to macro photographing and vice versa. Generally, an optical lens system of the zoom lens has a focusing lens assembly, a variable power (or a power changing) lens assembly, a compensating lens assembly and a master lens assembly, which are arranged in this order from front. When zooming is effected for zooming photographing, the actuation ring is linearly displaced forward and backward with respect to a mount securing lens barrel to move the variable power lens assembly and the compensating lens assembly while keeping a predetermined positional relationship therebetween. When focusing is effected, the actuation ring is rotated to move the focusing lens assembly.

On the other hand, in case of macro photographing, the focusing lens assembly and the compensating lens assembly have to be moved with a predetermined positional relationship, by the rotation of the same actuation ring. This requires the provision of any switching or shifting means of the movement of the actuation ring. However, prior art switching (shifting) means is complex and cannot be easily manufactured and tends to become inoperative or the cause maloperation. Furthermore, prior art switching means has a mechanical switch for converting the zoom photographing to the macro photographing and vice versa, which results in a decrease of operation efficiency.

The primary object of the present invention is to provide a switching apparatus for easily, quickly and smoothly effecting conversion of zooming photographing (or macro photographing) to macro photographing (or zooming photographing).

In a zoom lens assembly having an actuation ring, a mount securing lens barrel inserted in the actuation ring, and a converting ring inserted in the lens barrel, wherein the converting ring, on one hand, linearly moves together with the actuation ring with respect to the mount securing lens barrel without any relative rotational movement between the lens barrel and the converting ring, at zooming photographing, and, on the other hand, rotates together with the actuation ring with respect to the lens barrel, at macro photographing, to cause desired movements of the zoom lens, according to the present invention, a ball retaining groove, a radial through hole and a ball receiving hole are provided on the lens barrel, the converting ring and the actuation ring, respectively, and a ball is located between the ball retaining groove and the radial through hole to prevent the relative rotation between the converting ring and the lens barrel at zooming photographing. The ball comes out from the ball retaining groove at macro photographing and is forced between the radial through hole and the receiving hole.

The invention will be explained below in detail, with reference to the accompanying drawings which show preferred embodiments of the invention.

Figure 1:
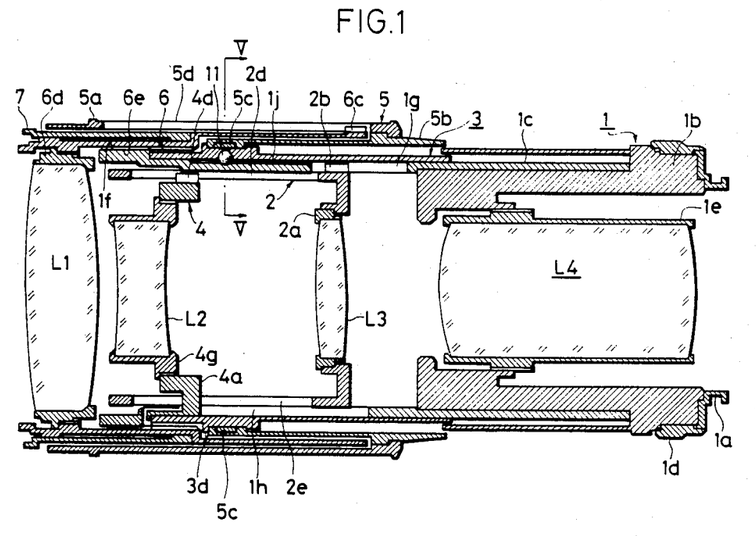
FIG. 1 is a longitudinal sectional view of a zoom lens assembly, according to the present invention.

In FIG. 1, the lens system comprises the focusing lens assembly L1, the variable power lens assembly L2, the compensating lens assembly L3 and the master lens assembly L4, which are arranged in this order when viewed from the front side. The following description will be first directed to how these lens assembly can be controlled (See FIG. 2).

Figure 2:
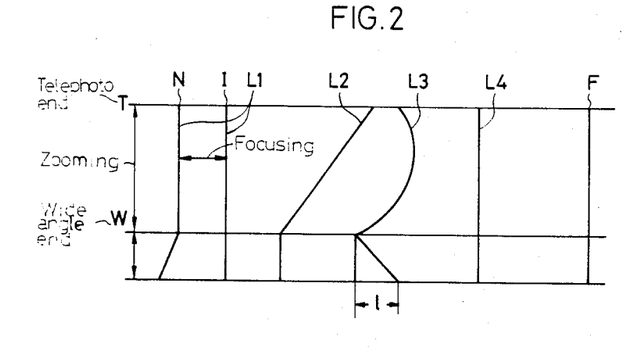
FIG. 2 is a diagram showing the movements of a focussing lens assembly, a variable power lens assembly, a compensating lens assembly and a master lens assembly, shown in FIG. 1.

Zooming can be effected by the linear movement of the actuation ring 5 (FIG. 1) in the optical axis direction between a telephoto end position T and a wide angle end position W. The actuation ring 5 causes the variable power lens assembly L2 and the compensating lens assembly L3 to move along a straight line locus and a curved line locus, with respect to a film surface F, respectively, as shown in FIG. 2. The focusing lens assembly L1 does not move at zooming and moves between a shortest object distance position N and an infinite object distance position I with the help of a helicoid only when the actuation ring rotates at focusing. The master lens assembly L4 is continuously immovable.

On the other hand, macro photographing is effected when the actuation ring which is located at the shortest object distance position N in the wide angle end position W, is further rotated toward a close-up position. The further rotation of the actuation ring will be referred to as "macro rotation" of "macro photographing" hereinafter to distinguish it from focussing within the range in which zooming can be effected. By the macro rotation of the actuation ring, the focussing lens assembly L1 and the compensating lens assembly L3 move as shown in FIG. 2. At macro photographing, the variable power lens assembly L2 does not move in the optical axis direction.

Lens barrel constructions for zooming and focusing and for macro photographing are perse known. The present invention is not directed to such lens barrel constructions but mainly to a switching mechanism between zooming photographing and macro photographing.

Referring back to FIG. 1, the mount securing lens barrel 1 has a mount 1a which can be mounted to a camera body (not shown), a connecting member 1b, an elongated cylinder 1c, and a diaphragm scale ring 1d. The connecting member 1b is provided, on its inner periphery, with a threaded portion which is engaged by the master lens assembly L4 which is supported by a master lens frame 1e. The elongated cylinder 1c is provided, on its front end, with a male helicoid 1f. On the periphery of the cylinder 1c is provided a cam groove 1g for the compensating lens assembly, a pair of guide grooves 1h extending in a direction parallel to the optical axis for the linear movement of the convert ring 3, a pair of guide grooves 1i for the rotational movement of the convert ring 3, which guide grooves 1i are connected to the front ends of the guide grooves 1h and extending perpendicular to the guide grooves 1h, and a ball retaining groove 1j extending in a direction parallel to the optical axis. A compensating ring 2 is fitted in the cylinder 1c which is, in turn, fitted in the convert ring 3. The compensating lens assembly L3 is supported by a compensating lens frame 2a which is screwed in the rear end of the compensating ring 2. The compensating ring 2 is provided, on its outer periphery, with threaded holes 2f which are engaged by screws 2c which rotatably support compensating rollers 2b fitted in the cam grooves 1g of the cylinder 1c. On the periphery of the compensating ring 2 are provided a pair of lead grooves 2d and escape grooves 2e for the variable power lens assembly. Radial projections 4a of the variable power ring 4 are located in the escape grooves 2e. In the lead grooves 2d are fitted variable power ring rollers 4d which are rotatably supported by screws 4c which are screwed in threaded holes 4b provided on the periphery of the variable power ring 4. The radial projections 4a are also fitted in the guide grooves 1h of the mount securing lens barrel 1 and are secured to the convert ring 3 by means of set screws 4f which extend through mounting holes 3a of the convert ring 3 to engage in threaded holes 4e. Thus, the convert ring 3 can be moved linearly in the optical axis direction with respect to the mount securing lens barrel 1, by means of engagement of the radial projections 4a of the variable power ring 4 integral with the convert ring 3, in the guide grooves 1h. The linear movement of the convert ring 3 causes the variable power lens assembly L2 to move linearly, since the lens assembly L2 is held by a variable power lens frame 4g which is screwed in the variable power ring 4. When the lens assembly L2 moves linearly, the compensating ring 2 which has the lead grooves 2d in which the rollers 4d of the variable power ring 4 are fitted rotate, so that the rollers 2b of the compensating ring 2 are displaced in the cam grooves 1h of the mount securing lens barrel 1. The displacement of the rollers 2b causes the compensating lens assembly L3 to move so as to adjust the displacement of focal point due to the movement of the variable power lens assembly L2, as shown in FIG. 2. The above mentioned operation is a zooming operation. By the movement of the convert ring 3 between the rear end position (telephoto end position T) and the front end position (wide angle end position W), can be varied the focal length of the entirety of the lens system.

The actuation ring 5 which is fitted on the periphery of the convert ring 3 has an outer ring 5a, an object distance scale ring 5b, and a half ring 5c for limiting the rotational movement thereof. The outer ring 5a has a pair of linear movement guide grooves 5d which extend in a direction parallel to the optical axis and in which are fitted heicoid rollers 6c which are rotatably supported by screws 6b screwed in corresponding threaded holes 6a of a helicoid ring 6. The helicoid ring 6 is provided, on its front end, with a threaded portion in which is engaged a focusing lens frame 6d supporting the focusing lens assembly L1. The helicoid ring 6 has a female helicoid 6e which engages with the male helicoid 1f of the mount securing lens barrel 1. The outer ring 5a has stepped holes (counter boring holes) 5e which receive therein set screws 5g which are screwed in corresponding threaded holes 5f of the scale ring 5b.

The scale ring 5b has, at its rear outer end, a distance scale 5h and, at its inner front end, a smaller diameter portion 5i in which a mounting portion 3b of the convert ring 3 is rotatably fitted. When the smaller diameter portion 5i is rotatably fitted on the portion 3b, the portion 5i is located between a flange 3d of the convert ring 3 and a nut (not shown) which is engaged on a threaded portion 3c of the convert ring 3, so that the scale ring 5b can rotate without moving in the optical axis direction.

The half ring 5c is located in an inner peripheral groove 5j of the smaller diameter portion 5i and is secured thereto by means of set screws 5l which are screwed in threaded holes 5k. The half ring 5c has opposed ends which comes into contact with a stop pin 3f screwed in a threaded hole 3e of the portion 3b of the convert ring 3 to limit the rotational movement of the actuation ring 5 within a predetermined angular range. The stop pin 3f is screwed in the threaded hole 3e through one of mounting holes 5m of the scale ring 5b after the actuation ring 5 and the convert ring 3 are assembled together. On the outer periphery of the outer ring 5a is provided a face ring (not shown).

By the above mentioned construction, the actuation ring 5 can rotate between two end portions in which the opposed ends of the half ring 5c come into contact with the stop pin 3f, with respect to the convert ring 3. The rotation of the actuation ring causes the helicoid 6 to rotate by way of the guide groove 5d and the helicoid roller 6c, so that the helicoid ring 6 and accordingly the focusing lens assembly L1 are moved by means of the helicoids 6e and 1f. This is a focusing operation in which the focusing lens assembly L1 moves between the shortest object distance position N and the infinite object distance position I. The numeral 7 in FIG. 1 designates a hood which is located between the outer ring 5a of the actuation ring 5 and the helicoid ring 6 so that the hood can project from and retract in the front ends of the outer ring 5a and the helicoid ring 6.

A switching mechanism for converting from the zooming photographing to the macro photographing is provided between the actuation ring 5, the convert ring 3, and the mount securing lens barrel 1. As mentioned before, the ball retaining V-shaped groove 1j and the rotational movement guide grooves 1i are provided on the cylinder 1c of the mount securing lens barrel 1. The convert ring 3 a radial through hole 10 on the portion 3b for enabling a steel ball 11 to move up and down therein. The hole 10 is elongated peripherally, and the width thereof is such that the ball 11 cannot move in the optical axis direction. The elongated radial through hole 10 is provided, on its one end, with a stepped (spot facing) groove 12 in which a leaf spring 13 is mounted by means of set screws 14 to press the ball 11 against the opposite end of the elongated hole 10. The numeral 15 designates threaded holes of the leaf spring 13 which is engaged by the set screws 14. The leaf spring 13 has, at its front end, a ball keeping member 16.

The half ring 5c is preferably made of material, such as steel or the like, which has a higher wear-resistance than that of the scale ring 5b which is usually made of aluminum alloy. The half ring 5c has a ball receiving hole 17 which receives the ball 11 located at the end of the elongated radial through hole 10 only when one end of the half ring 5c comes into contact with the stop pin 3f, that is, only when the actuation ring 5 located at the wide angle position W rotates toward the shortest object distance position N. The diameter of the receiving hole 17 is slightly smaller than that of the ball 11. It should be noted here that the diameter of the ball 11 and the depth of the V-shaped groove 1j are such that when the receiving hole 17 is not positioned directly on the ball 11, the ball 11 is located between the radial through hole 10 and the V-shaped groove 1j to prevent the convert ring 3 from moving relative to the mount securing lens barrel 1 and that when steel ball 11 comes out of the V-shaped groove 1j and comes between the radial through hole 10 and the ball receiving hole 17, the ball causes the convert ring 3 to be integral with the actuation ring 5.

In the zoom lens assembly of the present invention, the conversion of zooming photographing to macro photographing is effected as follows.

Since the actuation ring 5 is connected to the convert ring 3 so as not to move in the optical direction, as mentioned above, zooming can be effected by the linear movement of the convert ring 3 which is, in turn, produced by the linear movement of the actuation ring 5. On the other hand, focusing can be effected by the rotation of the actuation ring 5 which causes the helicoid ring 6 to rotate. The linear movement guide grooves 5d and the rollers 6c of the helicoid ring 6 enable zooming and focusing independently or at one time.

Figure 4:
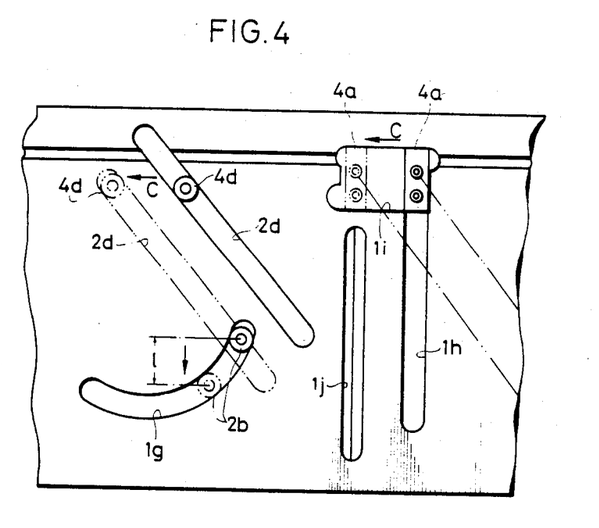
FIG. 4 is a developed view showing the movement of the compensating lens assembly at macro photographing.
Figure 5A:
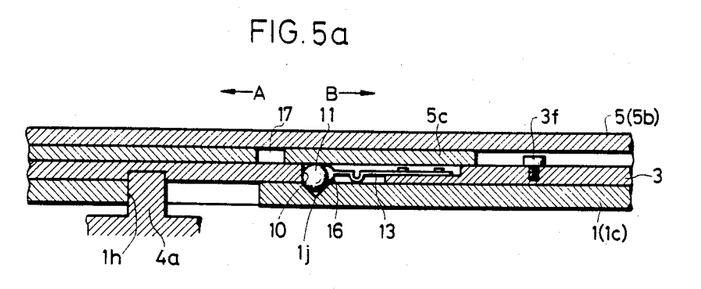
FIGS. 5a to 5f are developed sectional views taken along the line V—V in FIG. 1, shown at different positions of a switching mechanism for converting zooming photographing to macro photographing.

When the actuation ring 5 comes to the front end, i.e., the wide angle position W, the radial projections 4a of the variable power ring 4 come to the front ends of the guide grooves 1h of the mount securing lens barrel 1 and, accordingly, to one end of the guide groove 1i (See FIG. 4). At this position, when the actuation ring 5 rotates to effect focusing, a small rotational force is also applied to the convert ring 3. However, the rotation of the convert ring 3 relative to the lens barrel 1 is prevented on one hand in the direction designated by an arrow A in FIG. 5a by the projections 4a of the variable power ring 4 which bear against the side walls of the guide grooves 1h, and on the other hand in the opposite direction designated by an arrow B in FIG. 5a by the steel ball 11 which is located between the V-shaped groove 1j and the radial through hole 10 and which bears against the inner periphery of the half ring 5c. That is, even at the wide angle position W, normal focusing can be effected.

Figure 5B:
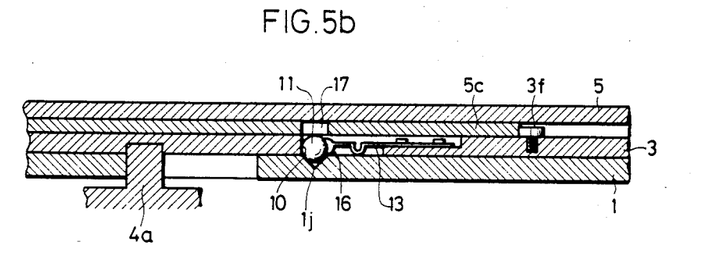

When the actuation ring 5 at the wide angle position W is rotated toward the shortest object distance position, one end of the half ring 5c comes into contact with the stop pin 3f, as shown in FIG. 5b. At this position, the ball receiving hole 17 is located directly above the steel ball 11, but conversion of zooming photographing to macro photographing is not yet completed. Accordingly, the actuation ring 5 is free to rotate toward the infinite object distance position.

Figure 5C:
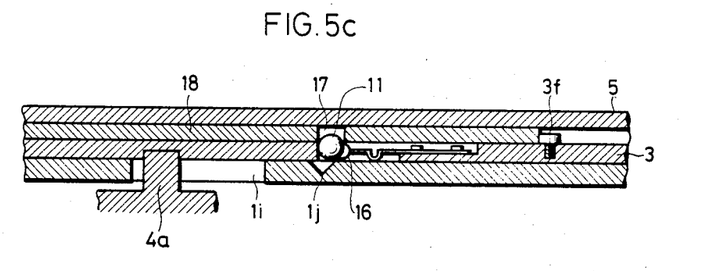
Figure 5D:
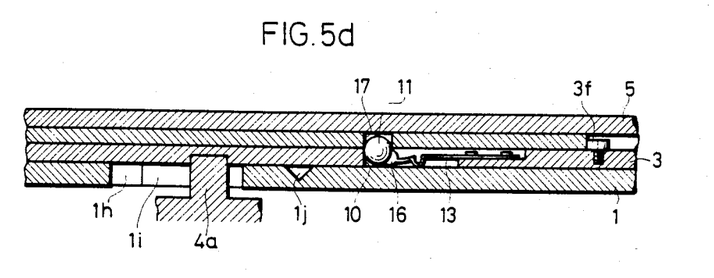

Further rotation of the actuation ring 5 in the direction B from a position shown in FIG. 5b, with a larger rotational force causes the convert ring 3 to push the ball 11 so that the ball 11 comes out of the V-shaped groove 1j and partially projects into the ball receiving hole 17, as shown in FIG. 5c. By the projection of a part (head) of the ball 11 in the ball receiving hole 17, the actuation ring 5 becomes integral with the convert ring 3, so that the convert ring 3 can rotate with respect to the mount securing lens barrel 1. Consequently, the rotation of the actuation ring 5 causes the convert ring 3 and the variable power ring 4 to rotate together, so that the projections 4a of the variable power ring 4 move (rotate) in the associated guide grooves 1i of the lens barrel 1. The movement of the projections 4a causes the rollers 4d of the variable power ring 4 to move as shown by an arrow C in FIG. 4, so that the compensating ring 2 having the lead grooves 2d in which the rollers 4d are engaged rotates. When the compensating ring 2 rotates, the roller 2b moves in and along the cam groove 1g of the lens barrel 1 to move the compensating lens assembly 13 in accordance with the cam profile of the cam groove 1g. The maximum displacement of the compensating lens assembly 13 is represented by—in FIG. 2. Since the rotation of the actuation ring 5 also moves the focusing lens assembly L1 in the optical direction and since the variable power ring 4 rotates without moving in the optical direction, the movement of the lens assemblies as a whole for macro photographing as shown in FIG. 2 can be effected (See FIG. 5d).

Figure 5E:
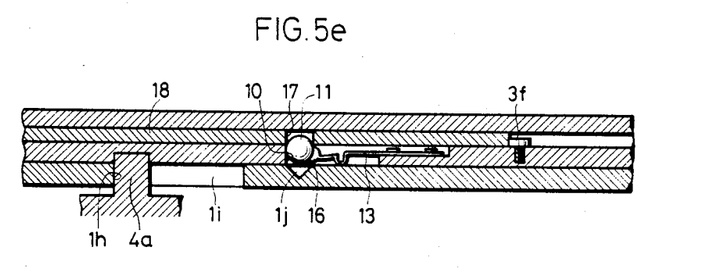
Figure 5F:
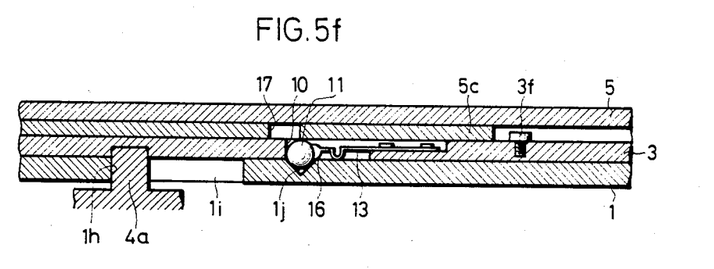

To turn macro photographing back to zooming photographing, the actuation ring 5 is merely rotated toward the infinite object distance position. The convert ring 3 rotates together with the actuation ring 5 until the radial projections 4a of the variable power ring 4 come into contact with one end of the associated guide grooves 1h, as shown in FIG. 5e. By further rotation of the actuation ring 5 after the radial projections 4a are brought into contact with the ends of the corresponding guide grooves 1h, the steel ball 11 comes out of from the ball receiving hole 17 to occupy again the initial zooming photographing position, as shown in FIG. 5f. In order to ensure that the ball 11 can easily come out of from the ball receiving hole 17, the hole 17 is preferably of conical shape.

The peripherally elongated radial through hole 10 can be theoritically replaced by a circular radial through hole complementary to the ball 11, because the ball 11 can be brought between the V-shaped groove 1j and the ball receiving hole 17 even if the hole 10 is such a circular hole. However, preferably, the ball is located in the elongated hole so that the ball is pressed against one end of the elongated hole by means of any spring means, such as the leaf spring 13 to ensure a smooth movement of the ball with a click, in view of an presence of a possible play between the ball 11 and the elongated hole 10.

Figure 6A:
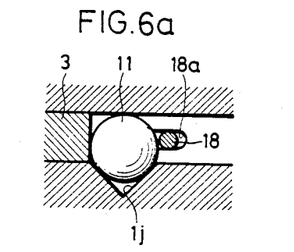
FIGS. 6a and 6b are sectional view and plan view showing another embodiment of means for pressing a ball.
Figure 6B:
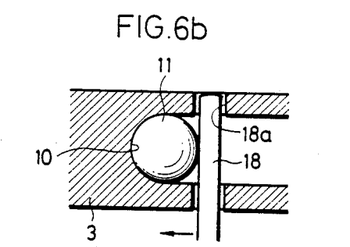

FIGS. 6a and 6b show another embodiment of spring means for pressing the ball 11. In this embodiment, a barlike spring 18 having a circular section bears against the ball 11 in the vicinity of but not on the horizontal center line of the ball to press the ball 11 against one end of the elongated hole 10. A slot 18a is provided in the convert ring 3 to enable the spring 18 to move in the horizontal direction in FIG. 6a when the ball 11 moves up and down.

Figure 7A:
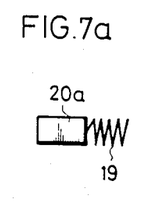
FIGS. 7a and 7b and FIG. 8 are plan views showing different embodiments of means for pressing the ball.
Figure 7B:
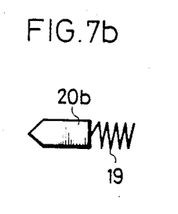
Figure 8:
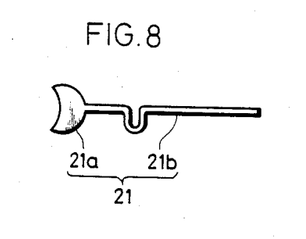

FIGS. 7a and 7b show different embodiments of spring means. In FIGS. 7a and 7b are shown different shapes of abutments 20a and 20b which are biased by means of coil springs 19, respectively to press the abutments against one peripheral end of the radial through hole 10. Alternatively, it is also possible to provide a pressing member 21 which has an abutment 21a and a leaf spring 21b integral therewith, as shown in FIG. 8.

Figure 3:
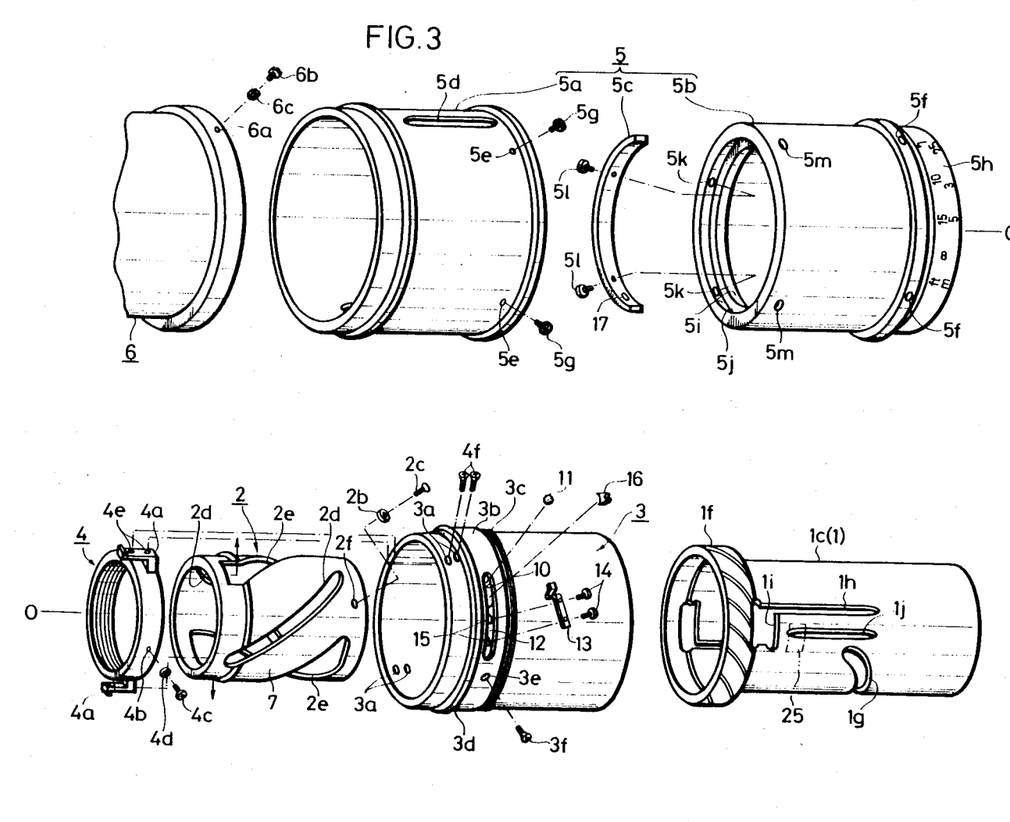
FIG. 3 is an exploded perspective view of ring members of the zoom lens assembly shown in FIG. 1.
Figure 9:
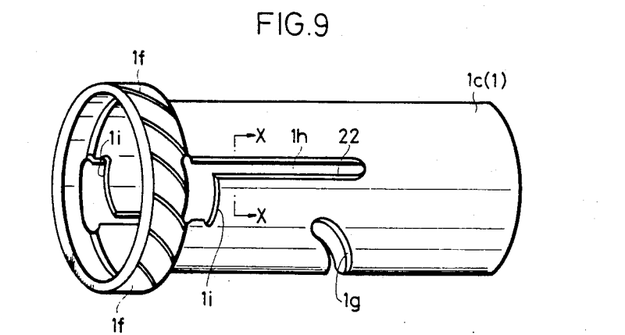
FIG. 9 is a perspective view showing another embodiment of a ball retaining groove.
Figure 10:
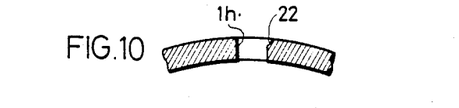
FIG. 10 is a sectional view taken along the line X—X in FIG. 9.
Figure 11:
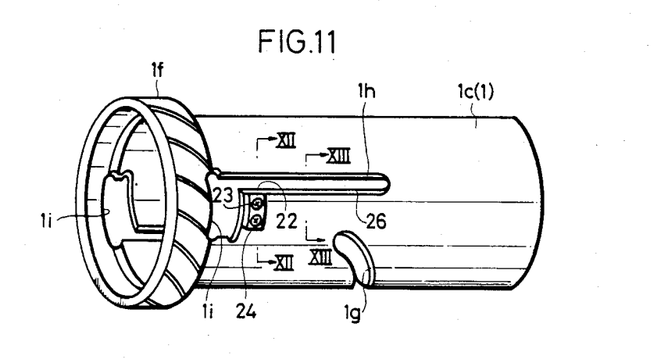
FIG. 11 is a perspective view showing still another embodiment of a ball retaining groove; and, FIGS. 12 and 13 are sectional views taken along the lines XII—XII and XIII—XIII in FIG. 11, respectively.
Figure 12:
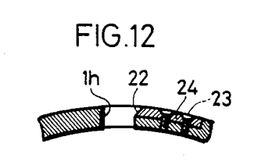
Figure 13:
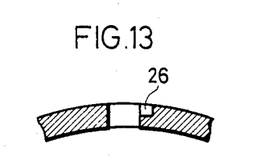

In the illustrated embodiments, the V-shaped groove 1j is provided on the mount securing lens barrel 1. However, the V-shaped groove 1j can be replaced by a retaining groove 22 which is formed on one side of one guide groove 1h by chamfering the same, as shown in FIGS. 9 and 10. The mount securing lens barrel 1 is usually made of aluminum alloy which has a relatively small wear-resistance. In order to increase the wear-resistance, a wear-resistance material 24, such as steel or the like can be provided on the retaining groove 22 and on the portion of the cylinder 1c adjacent to the retaining groove 22, as shown in FIGS. 11 and 12. The wear-resistance material 24 can be connected to the retaining groove 24 by means of set screws 23. In case of the arrangement shown in FIG. 3, a wear-resistance material 25 can be provided only on the front end of the separate V-shaped groove 1j, as shown by an imaginary line. The inclined retaining groove 22 shown in FIGS. 10 and 12 can be replaced by an angular or rectangular shaped groove 26 shown in FIG. 13.

In the illustrated embodiments, the conversion of zooming photographing to macro photographing is effected when the actuation ring is located at the shortest object distance position in the wide angle end position. However, this can be modified so that the conversion is effected when the actuation ring is located at the shortest object distance position in the telephoto end position, in accordance with a predetermined focal length. This modification can be achieved by providing the rotational movement guide grooves 1i on the rear ends of the linear movement guide grooves 1h rather than on the front ends thereof. Of course, the modification accompanies obvious modifications of the elements associated with the guide grooves 1i and 1h.

As can be understood from the above discussion, according to the present invention, zooming, normal focusing and macro photographing can be all effected by a single actuation ring without decreasing operability of a linear movement type of zoom lens. Furthermore, according to the present invention, switching between zooming photographing and macro photographing can be smoothly and surely effected with a click by moving the ball up and down so that a part of the ball selectively comes in the part integral with the mount securing lens barrel or in the part integral with the actuation ring, with the rotational force of the actuation ring. Thus, a zoom lens having high precision and long life, which can decrease the possibility of accidental switching and mal-operation can be obtained, according to the present invention.

I claim:

1. In a zoom lens assembly having a zoom lens, a mount securing lens barrel which is to be secured to a camera body, an actuation ring capable of linearly moving in an optical direction for zooming and of rotating for focusing, with respect to the mount securing lens barrel, and a convert ring which linearly moves along the mount securing lens barrel without rotating at the zooming operation of the actuation ring to move the zoom lens in order to effect zooming photographing and which rotates together with the actuation ring with respect to the mount securing lens barrel to move the zoom lens in order to effect macro photographing when the actuation ring rotates past the shortest object distance position of the zoom lens at one zooming end postion, an apparatus for converting of zooming photographing to macro photographing and vice versa comprising an arrangement in which the convert ring is fitted on the periphery of the mount securing lens barrel and the actuation ring is closely fitted on the convert ring, and further comprising a ball retaining groove provided on the mount securing lens barrel, a radial through hole on the convert ring, a ball capable of omni-directional rotation is located in the radial hole so as to move therein, a ball receiving hole provided on the actuation ring, wherein said ball is located between the ball retaining groove and the radial through hole during rotating of the actuation ring for focusing at one zooming end position thereof, to prevent the convert ring from rotating relative to the mount securing lens barrel, said ball comes out ot the ball retaining groove when the actuation ring rotates for macro photographing so that the ball comes between the radial through hole and the ball receiving hole to make the convert ring integral with the actuation ring in order to make a relative rotation of the convert ring to the mount securing lens barrel possible.

2. An apparatus according to claim 1, wherein said actuation ring comprises a half ring integral therewith, and wherein said convert ring comprises a stop pin with which both side of the half ring comes in contact to limit the rotation of the actuation ring.

3. An apparatus according to claim 2, wherein said ball receiving hole is provided in the half ring.

4. An apparatus according to claim 2, wherein said half ring is made of a material having a larger wear-resistance than that of a material of which makes the actuation ring is made.

5. An apparatus according to claim 4, wherein said actuation ring is made of aluminum alloy.

6. An apparatus according to claim 4, wherein said half ring is made of steel or the like.

7. An apparatus according to claim 1, wherein said ball retaining groove is made of wear-resistance material at least at the portion thereof that comes into contact with the ball when the ball comes in and out of the groove.

8. An apparatus according to claim 7, wherein the material of which the ball retaining groove is at least partially made has a larger wear-resistance than that of a material of which the mount securing lens barrel is made.

9. An apparatus according to claim 8, wherein said portion of the ball retaining groove is made of a steel material which is removably attached to the mount securing lens barrel.

10. An apparatus according to claim 1, wherein said mount securing lens barrel is provided with a linear movement guide groove for the convert ring.

11. An apparatus according to claim 10, wherein said ball retaining groove of the mount securing lens barrel is formed by a chamfered groove provided on one side of the linear movement guide groove.

12. An apparatus according to claim 2, further comprising spring means for pressing the ball against one peripheral end of the radial through hole of the convert ring.

13. An apparatus according to claim 12, wherein said spring means comprises a leaf spring which is provided, on its one end, with a member bearing against the ball and which is connected at its opposite end, to the convert ring.

14. An apparatus according to claim 12, wherein said spring means comprises a coil spring which is provided, on its one end, with a member bearing against the ball and which is secured, at its opposite end, to the convert ring.

15. An apparatus according to claim 12, wherein said spring means comprises a bar-like spring which directly bears against the ball.

16. An apparatus according to claim 1, wherein said ball is made of steel.

* * * * *

UNITED STATES PATENT AND TRADEMARK OFFICE
CERTIFICATE OF CORRECTION

PATENT NO. : 4,506,959
DATED : 26 March 1985
INVENTOR(S) : Yoshihiro Hama

It is certified that error appears in the above-identified patent and that said Letters Patent is hereby corrected as shown below:

On the first page, the assignee "Kabushiki" should be --Kabusiki--;

Column 1, line 40, "the cause maloperation" should be -- to cause mal-operation--;

Column 2, line 41, "these" should be --this--;

Column 4, line 9, "heicoid" should be --helicoid--;

Column 6, line 53, "theoritically" should be --theoretically--;

Column 6, line 61, "an" should be --a--;

Column 8, line 10, "postion" should be --position--;

Column 8, line 26, "ot" should be --of--; and,

Column 8, line 36, "side" should be --sides-- and "comes" should be --come--.

Signed and Sealed this

Twenty-fourth Day of September 1985

[SEAL]

Attest:

Attesting Officer

DONALD J. QUIGG

Commissioner of Patents and Trademarks—Designate